Patented Sept. 11, 1934

1,972,887

UNITED STATES PATENT OFFICE 1,972,887

METHOD OF PURIFICATION OF ALCOHOLIC MIXTURES

Crawford Hallock Greenewalt, Wilmington, Del., assignor to E. I. du Pont de Nemours & Company, Wilmington, Del., a corporation of Delaware No Drawing. Application February 28, 1931, Serial No. 519,272

4 Claims. (Cl. 260—162)

This invention relates to a process of purifying and separating the constituents of a mixture of saturated and unsaturated alcohols and their esters obtained by the catalytic high pressure dehydrogenation of ethyl alcohol. More particularly, it relates to a process for separating crotonyl alcohol from such mixture in the form of crotonyl chloride.

In the patent to F. C. Zeisberg No. 1,708,460, there is described a process wherein ethyl acetate, acetaldehyde and higher alcohols and esters are formed by passing the vapor of ethanol over dehydrogenating catalysts at a temperature between 250° C. and 500° C. and at a pressure of above 10 atmospheres. In this process, after the distillation of the products of the high pressure dehydrogenation reaction, the higher alcohols and esters make up an oily fraction which contains unsaturated compounds, notably crotonyl alcohol, crotonyl acetate, and other compounds which impart a sharp disagreeable odor to what would otherwise be a valuable solvent mixture.

It is an object of this invention to provide a process for separating and purifying the constituents of a mixture containing higher alcohols and their esters. Another object is to provide a process for separating crotonyl alcohol from said mixture. A further object is to provide a process for separating crotonyl alcohol from butanol. A still further object is to provide a convenient and efficient process for the preparation of crotonyl chloride. Other objects will appear hereinafter.

These objects are accomplished by the following invention which in its broadest aspects may be said to comprise treating the mixture obtained by the catalytic high pressure dehydrogenation of ethyl alcohol and containing a wide variety of substances, such as acetaldehyde, ethyl acetate, acetone, butanol, crotonyl alcohol, butyl acetate, smaller amounts of higher alcohols and larger amounts of the esters of these higher alcohols with aliphatic acids, such as acetic, butyric, crotonic, caprylic, capric, and higher members of the series, with dry hydrochloric acid gas in either a continuous or a discontinuous process with a view to converting the crotonyl alcohol to crotonyl chloride.

For a full description of the process for the preparation of the mixture of higher alcohols, esters and other compounds reference is made to the patent to F. C. Zeisberg No. 1,708,460. The mixture obtained by the process therein disclosed is subjected to fractional distillation and there are removed successively constituents boiling below the boiling point of ethyl acetate, ethyl acetate, unchanged ethanol, and a mixture of crotonyl and butyl alcohols, together with smaller amounts of higher alcohols and esters having higher boiling points than ethyl acetate. The fraction containing the crotonyl alcohol is caused to react with a slight excess of dry hydrochloric acid gas in either a batch or a continuous process whereby the crotonyl alcohol is converted to crotonyl chloride with the liberation of 1 molecule of water per molecule of crotonyl alcohol taking part in the reaction.

Examples of typical methods of carrying out the process of my invention are given below, but it is understood that they are given merely for the purpose of illustration and are not intended as a limitation thereon.

Example

A batch operation was carried out as follows:
Dry hydrochloric acid gas was passed rapidly into 1035 grams of a crude mixture of crotonyl and butyl alcohols containing about 25% crotonyl alcohol until 130 grams of the gas had been absorbed. This operation required approximately 45 minutes, a time which is dependent upon the rate at which the hydrochloric acid gas can be generated and not primarily upon its rate of absorption. During this period, the temperature of the liquid rose from room temperature to approximately 50° C. The mixture was allowed to stand several hours after which it was subjected to fractional distillation, using a ring filled laboratory column about 2 feet long. At first a small amount of unreacted hydrochloric acid gas was evolved. Distillation began at 68°, but the temperature rose rapidly to 74 to 75° at which point a mixture of crotonyl chloride, water, and HCl came off.

The fraction collected up to 78° separated on standing into an upper layer weighing 330 grams and a lower layer weighing 50 grams. The lower layer was found to consist of water containing 14% HCl. The upper layer was washed with water to remove HCl and dried with sodium sulfate, giving the 320 grams of crotonyl chloride, representing approximately a 98% yield of the chloride based on the HCl.

On continuing the distillation, there was obtained a fraction which boiled up to 110° C. This separated into two layers on standing. The lower layer weighing 42 grams contained 5.5% HCl, while the remainder was principally water. The upper layer amounting to 190 grams was found to be wet butanol containing 2.5% HCl.

Further distillation gave a cut boiling from 110

110 to 120° C., amounting to 405 grams and containing 0.07% HCl. This fraction was practically pure butanol of good odor. After the distillation had been completed, there remained a residue of 130 grams of material having the odor of butyl acetate.

Instead of using a batch process as just described, a continuous process may be used. The crude mixture of crotonyl and butyl alcohols may be passed downwards through an absorbing tower in which contact with the desired amount of dry HCl gas is obtained. The combination of the crotonyl alcohol with the HCl is very rapid so that the mixture coming from the bottom of the tower contains essentially no crotonyl alcohol, but rather crotonyl chloride together with the original butanol. This mixture is passed to a distilling column from the top of which the crotonyl chloride is taken, together with excess HCl, if any, water produced in the reaction, and any butanol which can not be prevented from coming over. From the bottom of the tower is drawn the butanol substantially free from crotonyl alcohol and any higher boiling oils which may be present in the original crotonyl-butyl alcohol mixture.

The crude crotonyl chloride distillate from the top of the tower is passed to a third column from the top of which is taken crotonyl chloride and water while from the bottom is drawn a mixture of butanol and water containing a small amount of HCl. This mixture can be returned to the system in the absorbing tower in order to provide for the complete utilization of the HCl.

In either method, inasmuch as the reaction between crotonyl alcohol and hydrochloric acid is exothermic, it is unnecessary to heat the crotonyl-butyl alcohol mixture in order to promote the chemical combination. Furthermore, the heat evolved assists materially in the distillation of the reaction product.

Of course, it is to be understood that many changes in the specific details of either the continuous or the discontinuous process as above described may be made within the scope of my invention. Although for reasons of economy, I prefer to employ a continuous method, the invention, is equally susceptible of the use of batch operations.

It will be apparent that the present invention has numerous advantages. The use of dry HCl gas has the advantage over the use of aqueous HCl in that only the theoretical amount of gas is required, thus doing away with the necessity for the removal of large quantities of water in the distillation operations. Furthermore, attempts to obtain good yields of crotonyl chloride by treating the crotonyl-butyl alcohol mixture with aqueous HCl were unsuccessful, where as the use of the dry gas has given highly satisfactory results.

As many apparent and widely different embodiments of this invention may be made without departing from the spirit thereof, it is to be understood that I do not limit myself to the foregoing examples or description except as indicated in the following claims.

I claim:

1. The process which comprises, passing the vapor of ethyl alcohol over a dehydrogenating catalyst at a temperature between 250 and 500° C. and a pressure above 10 atmospheres to form ethyl acetate and an oily mixture containing acetaldehyde, acetone, butanol, crotonyl alcohol, butyl and crotonyl acetates, and other higher alcohols and esters of said alcohols with aliphatic acids including acetic, butyric, crotonic, caprylic, capric, passing dry hydrochloric acid gas into said mixture to convert said crotonyl alcohol to crotonyl chloride, and distilling off the crotonyl chloride thus formed.

2. The process which comprises passing the vapor of ethyl alcohol over a dehydrogenating catalyst at a temperature between 250° and 500° C. and a pressure above 10 atmospheres to form ethyl acetate and an oily mixture containing acetaldehyde, acetone, butanol, crotonyl alcohol, butyl and crotonyl acetates, and other higher alcohols and esters of said alcohols with aliphatic acids including acetic, butyric, crotonic, caprylic, capric, fractionally distilling the said mixture, passing dry hydrochloric acid gas into the fraction comprising butanol and crotonyl alcohol to convert said crotonyl alcohol to crotonyl chloride, and distilling off the crotonyl chloride thus formed.

3. The process of preparing crotonyl chloride which comprises passing dry hydrochloric acid gas into a mixture comprising essentially butanol, crotonyl alcohol, and esters of said alcohols with both saturated and unsaturated acids, and distilling off the crotonyl chloride thus formed.

4. The process of preparing crotonyl chloride which comprises passing dry hydrochloric acid gas into a mixture comprising substantially butanol and crotonyl alcohol, and distilling off the crotonyl chloride thus formed.

CRAWFORD HALLOCK GREENEWALT.